United States Patent
Ji et al.

(10) Patent No.: US 7,116,017 B2
(45) Date of Patent: Oct. 3, 2006

(54) DEVICE FOR REDUCING DETERIORATION OF IMAGE QUALITY IN DISPLAY USING LASER

(75) Inventors: Chang-Hyeon Ji, Seoul (KR); Young-Joo Yee, Gyeonggi-Do (KR); Jeong-Hoon Choi, Gyeonggi-Do (KR); Seong-Hyok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/067,919

(22) Filed: Mar. 1, 2005

(65) Prior Publication Data

US 2005/0195508 A1 Sep. 8, 2005

(30) Foreign Application Priority Data

Mar. 3, 2004 (KR) .................. 10-2004-0014398

(51) Int. Cl.
*H02K 1/06* (2006.01)
*H02K 33/02* (2006.01)
*G01L 1/24* (2006.01)

(52) U.S. Cl. .............. 310/23; 359/223; 359/872; 335/223; 335/235; 335/263

(58) Field of Classification Search ........... 359/872, 359/223; 335/262, 263, 223, 233, 235, 242; 310/12, 15, 17, 20, 21, 23

See application file for complete search history.

(56) References Cited

U.S. PATENT DOCUMENTS

| | | | |
|---|---|---|---|
| 4,100,576 A * | 7/1978 | Ditthardt ............... 369/44.17 |
| 4,155,630 A * | 5/1979 | Ih ............................. 359/707 |
| 4,462,013 A * | 7/1984 | Ueda et al. ............... 335/229 |
| 5,107,366 A | 4/1992 | Huang et al. | |
| 5,621,529 A * | 4/1997 | Gordon et al. ........... 356/604 |
| 5,883,712 A * | 3/1999 | Coffin ....................... 356/452 |
| 6,523,961 B1 * | 2/2003 | Ilkov et al. ................. 353/99 |
| 6,856,469 B1 * | 2/2005 | Yoneyama et al. ....... 359/696 |
| 6,946,754 B1 * | 9/2005 | Inagaki et al. ............. 310/12 |
| 2005/0195508 A1 * | 9/2005 | Ji et al. .................... 359/872 |

FOREIGN PATENT DOCUMENTS

| JP | 59-13476 | 1/1984 |
|---|---|---|
| JP | 60-1998 | 1/1985 |
| JP | 3-9228 | 1/1991 |

OTHER PUBLICATIONS

Trisnadi, J.I., "Speckle contrast reduction in laser projection displays," Projection Displays VIII, Jan. 23-24, 2002, vol. 4657, pp. 131-137, Proceedings of the SPIE, San Jose, California, USA.

* cited by examiner

*Primary Examiner*—Darren Schuberg
*Assistant Examiner*—David W. Scheuermann
(74) *Attorney, Agent, or Firm*—Birch, Stewart, Kolasch & Birch, LLP (57) ABSTRACT

Disclosed is a device for reducing deterioration of image quality which can get rid of speckle by equalizing a laser from a light source on a screen by vibrating a reflective mirror installed between the light source and the screen at a predetermined amplitude. The device for reducing deterioration of image quality in a display system using a laser as a light source includes: a reflective mirror formed at the path of light positioned between the light source and a screen, for reflecting the laser; and a driving unit connected to the reflective mirror and vibrating the reflective mirror at a predetermined amplitude by using an electromagnetic force.

12 Claims, 6 Drawing Sheets

DEVICE FOR REDUCING DETERIORATION OF IMAGE QUALITY IN DISPLAY USING LASER

BACKGROUND OF THE INVENTION

1. Field of the Invention

The present invention relates to, and more particularly, to a device for reducing deterioration of image quality resulted from speckle displayed on a display or rough outlines in a display system using laser light sources.

2. Description of the Background Art

In general, a laser has monochromaticity and directivity. By using such characteristics, the laser has been used in variety of fields such as optical communication, high-precision instrumentation, display or the like. As for a display system among them, a projection display method using laser light sources has been actively studied.

However, in case that an image is displayed by projecting a laser beam onto a screen or media equivalent to the screen, speckle noise formed by scattering or interference is generated.

Speckle noise is a phenomenon where the local brightness is generated on the screen at random. Since such speckle noise reduces image quality remarkably, reduction of speckle noise has arisen as the important task.

A device for reducing speckle for improving image quality should reduce speckle, operate with low power consumption. In addition, the device should be manufactured at the low unit price by not making a system excessively complicated, and be easy-to-assemble because of a small number of components.

Moreover, the device should allow its easy miniaturization, provide rapid responsiveness and secure reliability of its operation.

SUMMARY OF THE INVENTION

Therefore, an object of the present invention is to provide a device for reducing deterioration of image quality which can get rid of speckle by equalizing a laser from a light source on a screen by vibrating a reflective mirror installed between the light source and the screen at a predetermined amplitude.

To achieve these and other advantages and in accordance with the purpose of the present invention, as embodied and broadly described herein, there is provided A device for reducing deterioration of image quality in a display system using a laser as a light source, comprising: a reflective mirror formed at the path of light positioned between the light source and a screen, for reflecting the laser; and a driving unit connected to the reflective mirror and vibrating the reflective mirror at a predetermined amplitude by using an electromagnetic force.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of a device for reducing deterioration of image quality in accordance with the present invention will be described in detail with reference to the accompanying drawings.

There can be a plurality of embodiments in accordance with the present invention, of which the most preferred one will now be described.

Figure 1:
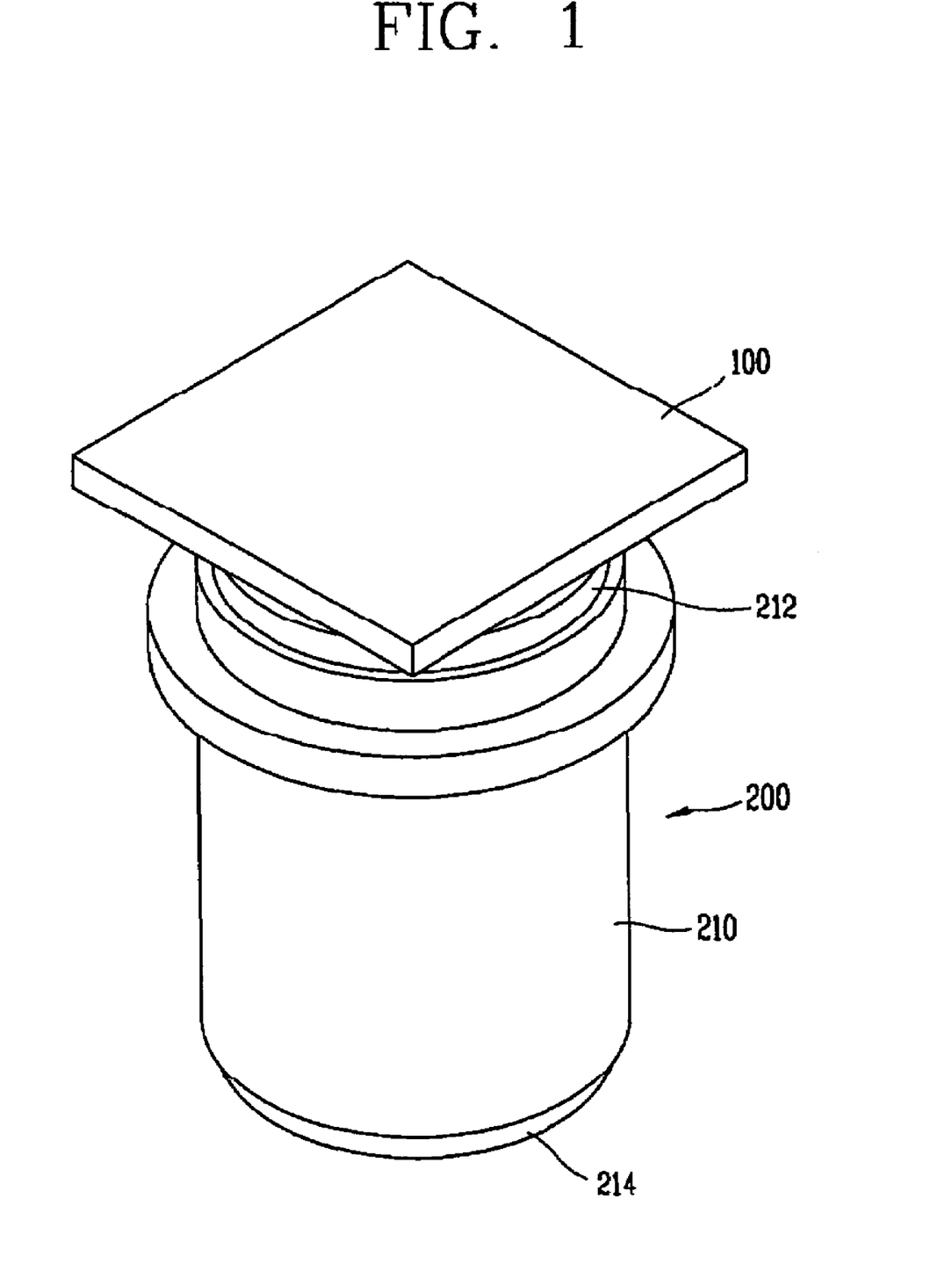
FIG. 1 is a perspective view showing an apparatus for reducing deterioration of image quality in accordance with the present invention.
Figure 2:
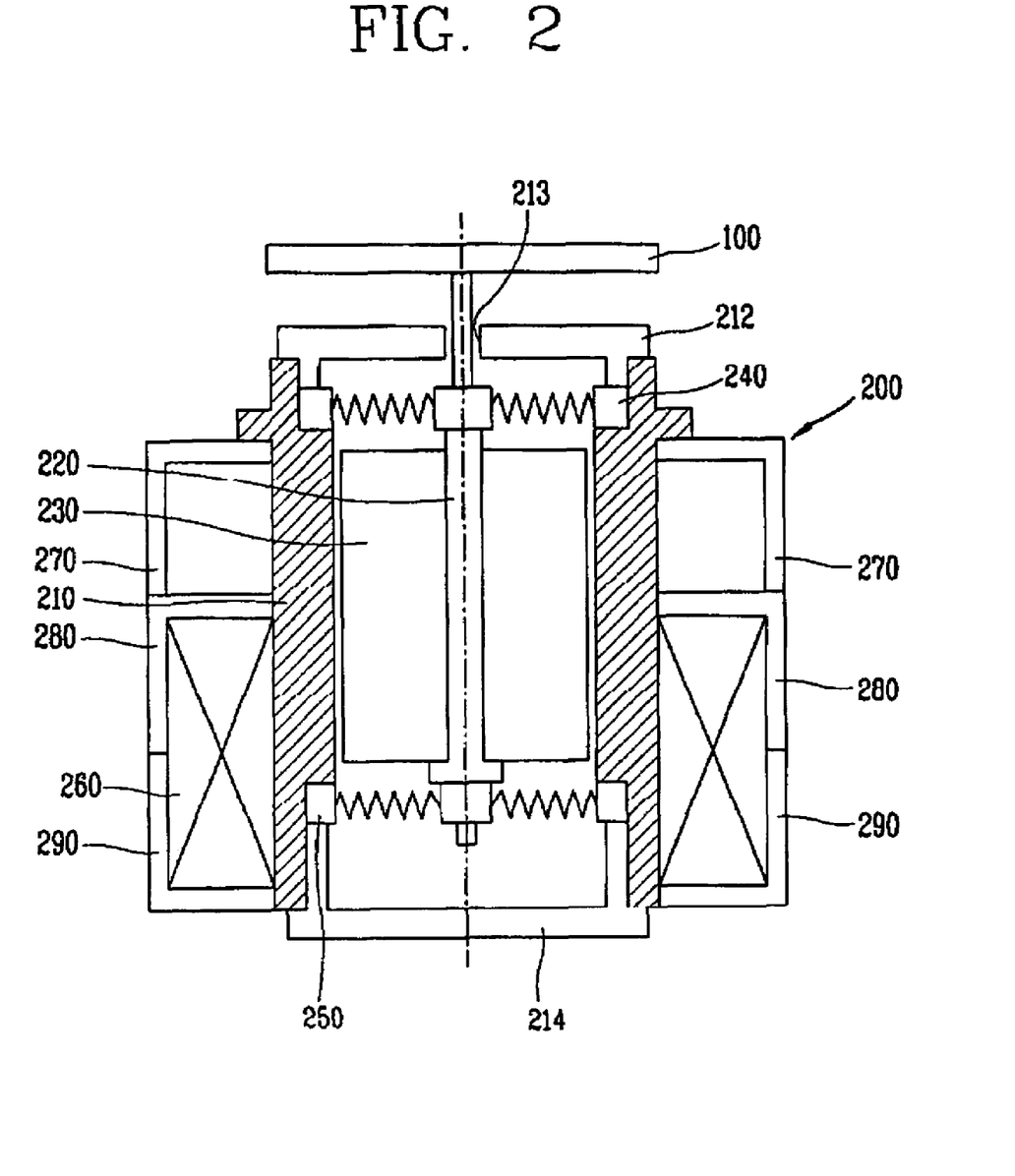
FIG. 2 is a cross-sectional view of FIG. 1.
Figure 3:
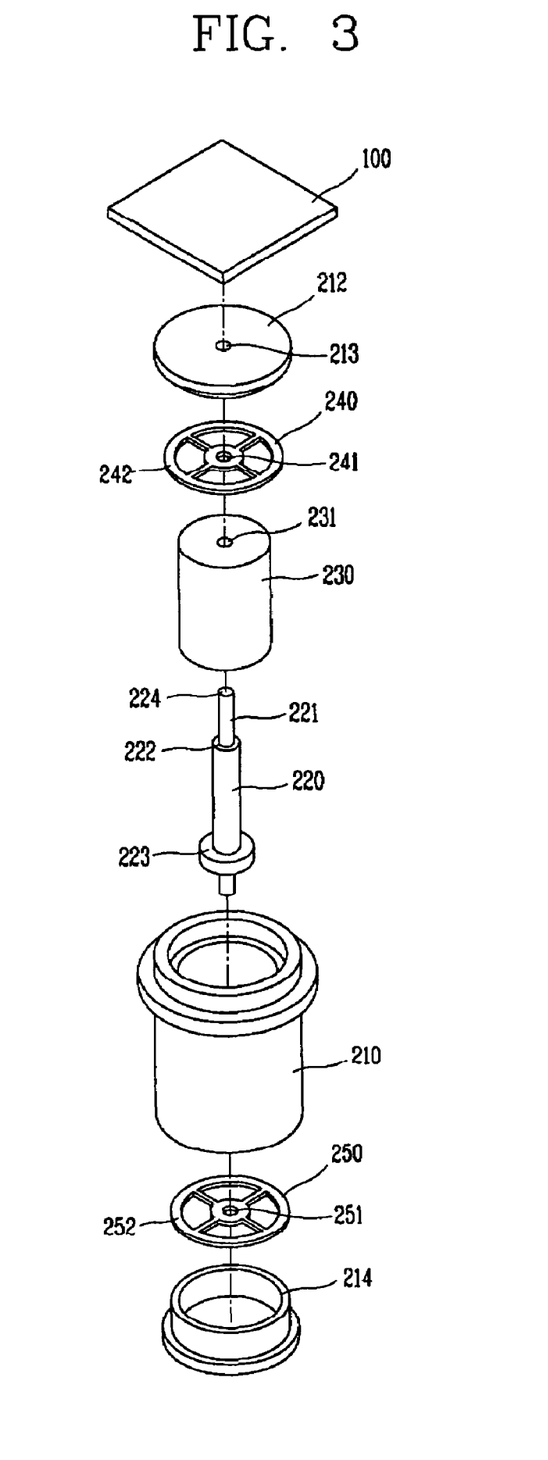
FIG. 3 is a perspective view showing the inside of a housing in accordance with the present invention.
Figure 4:
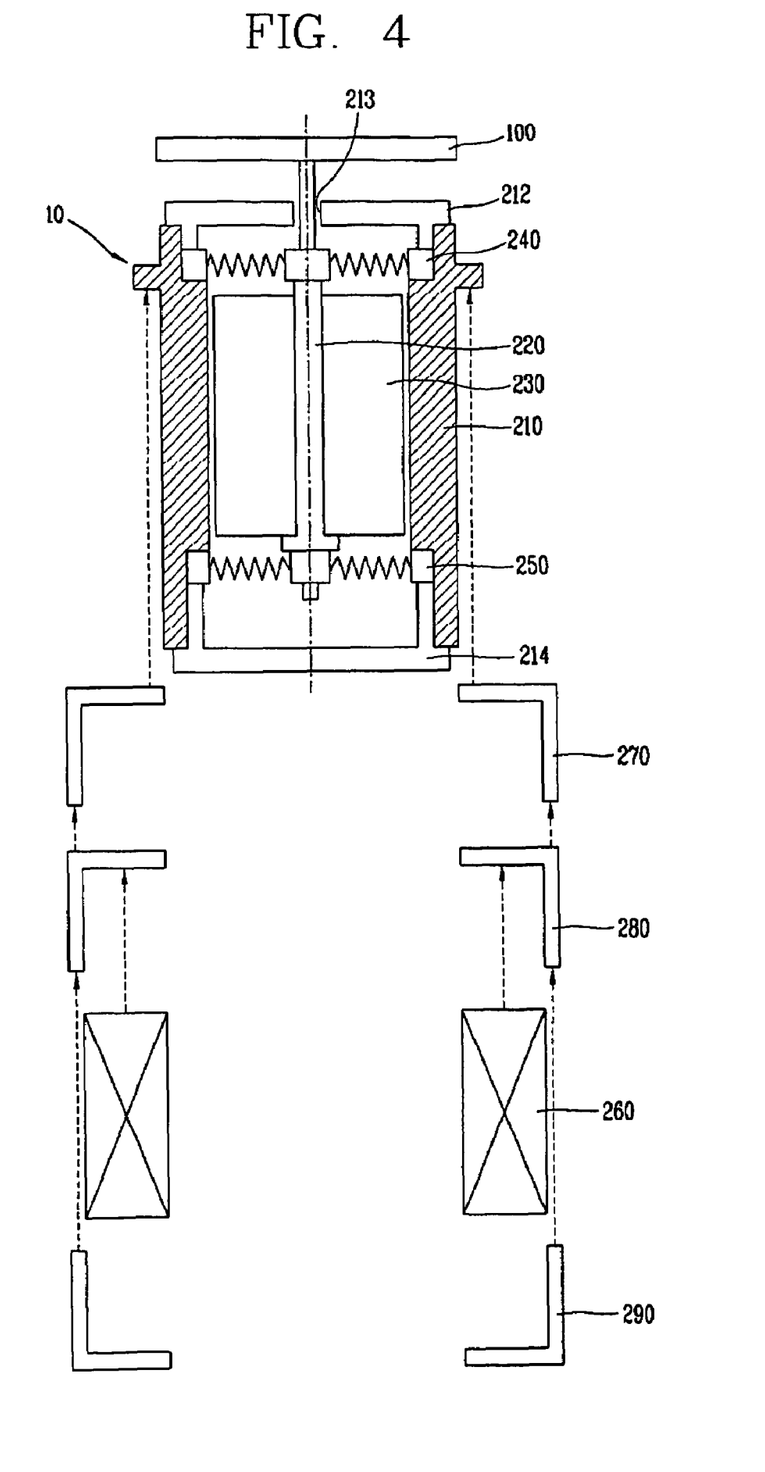
FIG. 4 is an exploded perspective view showing the coupling of the outside of the housing in accordance with the present invention.

FIG. 1 is a perspective view of a device for reducing deterioration of image quality in accordance with the present invention, FIG. 2 is a cross-sectional view of FIG. 1, FIG. 3 is a perspective view showing the inside of a housing in accordance with the present invention, and FIG. 4 is an exploded perspective view showing the coupling of the outside of the housing in accordance with the present invention.

As shown therein, the device for deterioration in image quality of the present invention in a display system using a laser as a light source includes: a reflective mirror 100 formed at the path of light positioned between the light source and a screen, for reflecting the laser; and a driving unit 200 connected to the reflective mirror 100 and vibrating the reflective mirror 100 at a predetermined amplitude by using an electromagnetic force.

Since polymer, metal, glass, silicon, or other substrates are provided with a reflective surface which is coated with gold, aluminum or the like, the reflective mirror 100 is formed to reflect the laser effectively.

The driving unit 200 includes: a cylindrical housing 210; a driving shaft 220 inserted into the center of a hollow of the housing 210; a permanent magnet 230 formed to encompass the driving shaft 220; upper and lower springs 240 and 250 formed as a leaf spring, for connecting and coupling an inner circumferential surface of the housing 210 to the driving shaft 220 in order to fix the driving shaft 220; a coil 260 formed to encompass a part of an outer wall of the housing 210; a first yoke 270 formed to encompass a part of the outer wall of the housing 210, which the coil 260 does not encompass; and second and third yokes 280 and 290 formed to encompass the coil 260 and having shapes corresponding to each other.

The housing 210 is formed in a hollow cylinder in order to receive the driving shaft 220 and the permanent magnet 230 therein, and is provided with an upper cap 212 and a lower cap 214 to hermetically close upper and lower ends of the housing 210.

The upper cap 212 seals up one surface of the housing adjacent to the reflective mirror 100, and forms a shaft hole 213 for penetrating the driving shaft 220 at its center in order to expose a front end surface of the driving shaft 220, which is coupled to the reflective mirror 100.

The lower cap 214 seals up one surface of the housing 210 far from the reflective mirror 100.

As the driving shaft 220 is penetratingly coupled to central holes 241 and 251 which are fixed to the inner circumferential surface of the housing 210, the driving shaft 220 does not come in contact with an inner wall of the housing and is installed at the hollow of the housing 210. Thus, the driving shaft 220 can freely move when an electromagnetic force is applied thereto. The driving shaft 220, provided with an end portion 222, forms a radius reducing portion 221 such that the radius of the shaft can be reduced in a direction where the reflective mirror 100 is located. As the radius reducing portion 221 is penetratingly inserted into the permanent magnet 230, the central hole 241 of the upper spring 240 and the upper cap 212, a front end surface 224 of the radius reducing portion 221 is coupled to the reflective mirror 100.

In addition, a protrusion portion 223 protrudingly formed to have a certain height in a radial direction such that the permanent magnet 230 can be put thereon is formed at a certain position of the driving shaft 220.

The permanent magnet 230 is provided with an installation hole 231 penetratingly formed at an inner center portion, allowing the driving shaft 220 to be inserted thereinto. The permanent magnet 230 is formed in one body with the driving shaft 220, and is installed to be put on the protrusion portion 223 formed at the driving shaft 220 as described above. If a magnetic field is produced when an electric current is applied to the coil 260 formed to encompass the outer wall of the housing 210, a driving force to move the driving shaft 220 in the axial direction is generated by interaction with the formed magnetic field.

In order for the magnetic field produced around an upper end of the magnet 230 to be focused into the circumference of an upper end of the first yoke 270 when an electric current is not applied to the coil 260, a reference position is preferably established such that an upper surface of the permanent magnet 230 maintains the same height as that of the first yoke 270.

The upper and lower springs 240 and 250 are plate-shaped springs, and have the central holes 241 and 251 penetratingly formed to fix the driving shaft 220 at its center. In addition, outer circumference portions 242 and 252 of the upper and lower springs 240 and 250 are coupled to an inner circumference of the housing 210 to thereby fix the driving shaft 220, and serve to apply an elastic force to return the driving shaft 220, which moves in one body with the reflective mirror 100, to the established reference position.

At this time, installing the upper and lower springs 240 and 250 at the inner circumference of the housing 210 is to ensure stability of position control of the driving shaft 220, for example, to prevent eccentricity of the driving shaft 220. In addition, preferably, the distance between the lower cap 214 and the driving shaft 220 is maintained properly in order to prevent the upper and lower springs 240 and 250 from being excessively transformed by immoderate displacement to exceed an elastic limit.

Meanwhile, two springs, the upper and lower springs 240 and 250, are used as a spring in the present embodiment, which can be constructed as one spring. The same effect as the embodiment of the present invention can be obtained by making a wobbling motion in a circular path or in an elliptical path by installing a spring having a shape asymmetrical to the driving shaft.

The coil 260 is at least one solenoid, is formed to encompass an outer circumference of the housing 210 as a winding form, and preferably uses a very small winding coil.

The first yoke 270 is made of materials having high permeability. Serving to focus a magnetic field into the circumference of a front end of the permanent magnet 230, the first yoke 270 returns the reflective mirror 100 to the set reference position all the time in a state that a driving current is not applied to the coil 260.

The second and third yokes 280 and 290 having high permeability are formed to encompass the coil 260, and prevent a magnetic field produced by the coil 260 from being lost to the outside.

The device for reducing deterioration in image quality is assembled as follows.

After the driving shaft 220 is inserted into the permanent magnet 230, and is fixed to and stopped by the protrusion portion 223, the central holes 241 and 251 of the upper and lower springs 240 and 250 are penetratingly fixed to upper and lower portions of the driving shaft 220. At this time, the outer circumference portions 242 and 252 of the upper and lower springs 240 and 250 are fixed to the inner circumference of the housing 210.

Thereafter, upper and lower opened surfaces of the housing 210 are closed by the upper cap 212 and the lower cap 214. At this time, the front end surface 224 of the driving shaft 220, which is exposed to the outside of the housing 210 through the shaft hole 213 of the upper cap 212, is coupled to the reflective mirror 100.

Thereafter, the coil 260 is wound to encompass the outer circumference of the housing 210, the second and third yokes 280 and 290 are attached to encompass the coil 260, and the first yoke 270 is assembled to encompass a part of the outer wall of the housing 210, which the coil 260 does not encompass.

Hereinafter, an operation and effect of the embodiment of the present invention will be described. Firstly, a state that an electric current is not applied to the coil will be described as follows.

Figure 5:
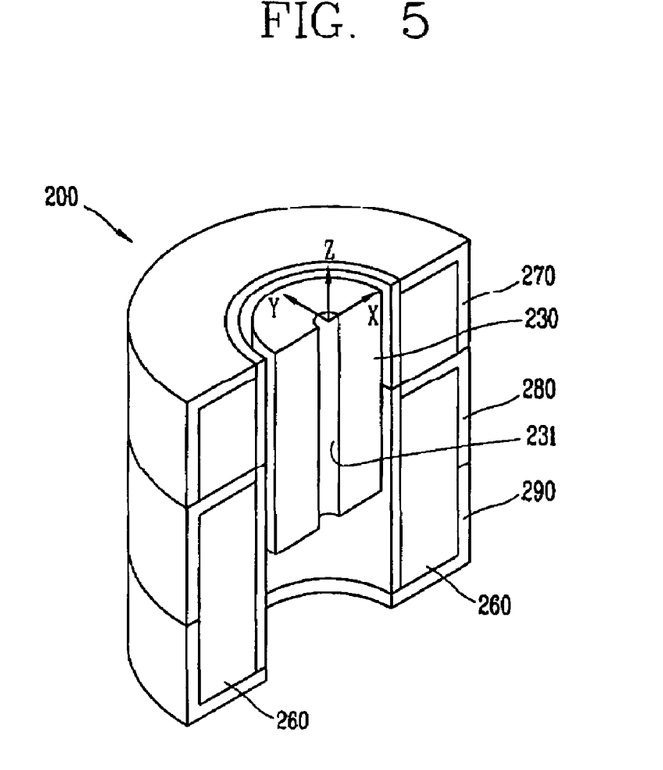
FIG. 5 is a cut-off perspective view showing an important part when a current is not applied to a coil.
Figure 6:
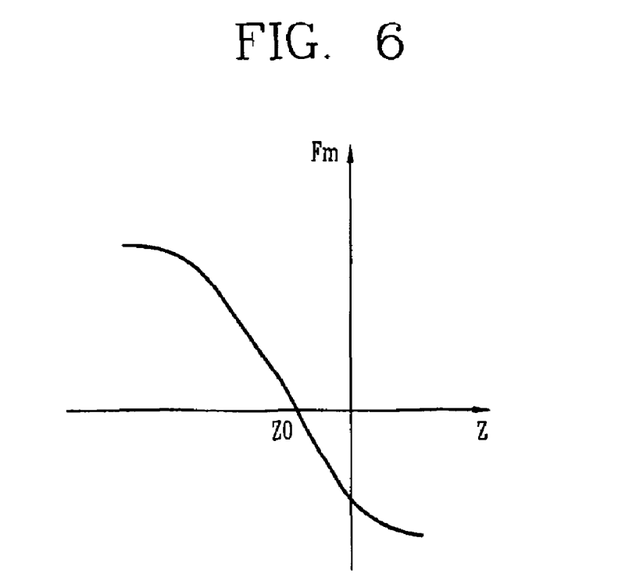
FIG. 6 is a graph illustrating a change of a magnetic force according to displacement of a permanent magnet when a current is not applied to the coil.

FIG. 5 is a cut-off perspective view an important part when an electric current is applied to the coil, and FIG. 6 is a graph illustrating a change of a magnetic force according to displacement of the permanent magnet.

When the permanent magnet 230 moves up and down along the Z axis of FIG. 5, a strong magnetic field is generated around the permanent magnet 230. A magnetic force (Fm) applied to the permanent magnet 230 by such a magnetic field is as shown in FIG. 6. Here, a value of the axis Z of FIG. 6 is a position of an upper surface of the first yoke 270, and $z_0$ is a position of an upper surface of the permanent magnet 230 when the upper surface of the permanent magnet 230 is positioned identically to that of the first yoke 270. As shown in FIG. 6, the position of the upper surface is higher than $z_0$, an elastic force is applied downward. If the position of the upper surface of the permanent magnet 230 is lower than $z_0$, a magnetic force is applied upward. In addition, if the permanent magnet 230 rises or drops, separated from $z_0$, an elastic energy is accumulated on the upper and lower springs 240 and 250 and therefore an elastic force to return the permanent magnet 230 to a reference position is applied. Accordingly, when a current is not applied to the coil 260, the permanent magnet 240 and 250 can remain levitated at the reference position very stably by interaction of the magnetic force and the elastic force of the upper and lower springs 240 and 250.

Next, a state that a current is applied to the coil will be described as follows.

Figure 7:
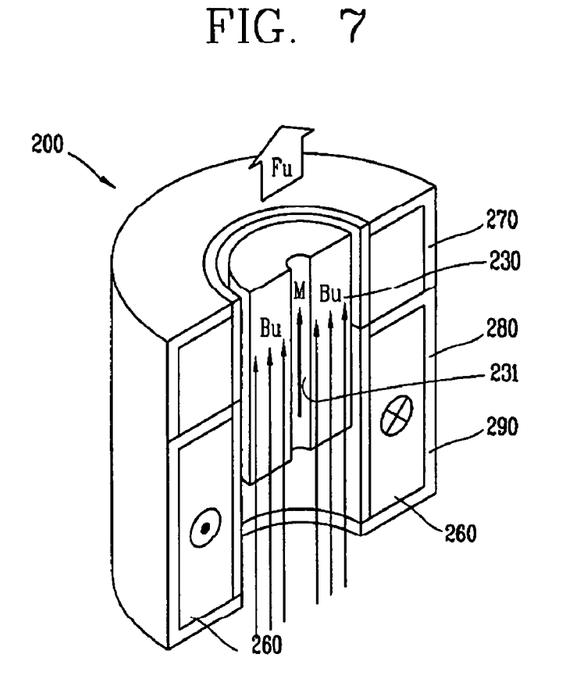
FIG. 7 is a cut-off perspective view of an important part of the present invention when a current is applied to the coil in the counterclockwise direction.
Figure 8:
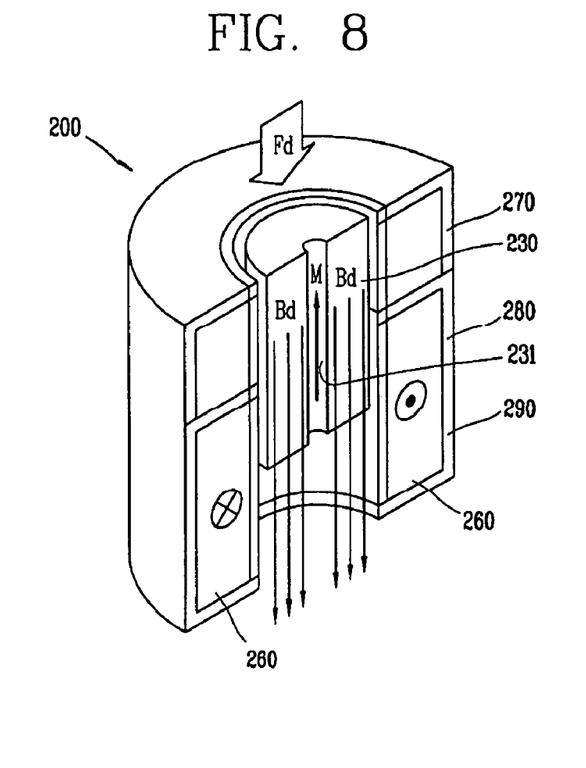
FIG. 8 is a cut-off perspective view of an important part of the present invention when a current is applied to the coil in the clockwise direction.

FIGS. 7 and 8 are cut-out perspective views of an important part of the present invention when a current is applied to the coil. FIG. 7 is a view showing that a current is applied to the coil in the counterclockwise direction, and FIG. 8 is a view showing that a current is applied to the coil in the clockwise direction. Here, reference numeral M represents Magnetic Field Intensity of the permanent magnet 230, Bu and Bd represent an Induction Magnetic Field generated when a current is applied to the coil 260, and Fu and Fd represent an induced electromotive force generated when a current is applied to the coil 260.

As shown in FIG. 7, when a current is applied to the coil 260 in the clockwise direction, an upward magnetic field (Bu) is induced within the housing 210 according to Fleming's Rule. The size of the induced magnetic field is proportional to intensity of the current applied to the coil 260. By the induction magnetic field (Bu), the induced electromotive force (Fu) is applied upward with respect to the permanent magnet 230. Accordingly, the permanent magnet 230 moves upward, and so does the reflective mirror 100 coupled to the front end surface 224 of the driving shaft 220 which moves in a body with the permanent magnet 230. At this time, an elastic force is applied to the upper and lower springs 240 and 250 in proportion to the distance at which the permanent magnet 230 moves upward. At the same time, a magnetic force applied to the permanent magnet 230 is also generated and therefore the permanent magnet 230 and the reflective mirror 100 move upward up to a position where the induced electromotive force (Fu) and the elastic force are balanced to each other.

In the same manner, as shown in FIG. 8, if a current is applied to the coil 260 in the clockwise direction, an upward magnetic field (Bu) is induced within the housing 210 according to Fleming's Rule. The size of the induced magnetic field is proportional to an intensity of the current applied to the coil 260. By the induction magnetic field (Bu), the induced electromotive force (Fu) with respect to the permanent magnet 230 is applied downward. Accordingly, the permanent magnet 230 moves downward, and so does the reflective mirror 100 coupled to the front end surface 224 of the driving shaft 220 which moves in a body with the permanent magnet 230. At this time, an elastic force is applied to the upper and lower springs 240 and 250 in proportion to the distance at which the permanent magnet 230 moves downward. At the same time, a magnetic force applied to the permanent magnet 230 is also generated and therefore the permanent magnet 230 and the reflective mirror 100 move downward up to a position where the induced electromotive force (Fu) and the elastic force are balanced to each other.

If a supply of the current applied to the coil 260 is stopped in a state that the reflective mirror 100 is moved to a predetermined position, the permanent magnet 230 and the reflective mirror 100 are returned to the reference position by the above-described elastic force and magnetic force. At this time, if the supply is stopped by gradually reducing the amount of the current, a certain damping effect is induced, thereby reducing the possibility of noise and damage, which may be generated when the excessive power is applied to the upper and lower springs 240 and 250 or when the driving shaft 220 bumps against the upper and lower caps 212 and 214. That is, since the size of the driving force is proportional to the displacement of the reflective mirror 100, a design for miniaturization of the device is enabled by controlling a variety of frequencies and driving displacement by controlling the directions and intensity of the driving current.

Accordingly, by vibrating the reflective mirror 100 installed between the light source and the screen at a predetermined amplitude, a laser from the light source is equalized to allow speckle to be removed, so that deterioration in a display screen can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A device for reducing deterioration of image quality in a display system using a laser as a light source, comprising:
    a reflective mirror formed on a light path positioned between the light source and a screen for reflecting the laser; and
    a driving unit connected to the reflective mirror and vibrating the reflective mirror at a predetermined amplitude by using an electromagnetic force,
    wherein the driving unit comprises:
        a cylindrical housing having a hollow;
        a driving shaft inserted into the center of the hollow of the housing;
        a permanent magnet formed to encompass the driving shaft;
        springs for connecting and coupling an inner circumferential surface of the housing to the driving shaft in order to fix the driving shaft;
        a coil formed to encompass a part of an outer wall of the housing; and
        yokes for encompassing the outer wall.

2. The device of claim 1, wherein the reflective mirror is formed in a such a manner that polymer, metal, glass, silicon, or other substrates are provided with a reflective surface which is coated with gold, aluminum or the like.

3. The device of claim 1, wherein the housing further comprises:
    an upper cap and a lower cap for hermetically closing upper and lower ends of the housing.

4. The device of claim 3, wherein the upper cap forms a shaft hole for penetrating the driving shaft at its center in order to expose a front end surface of the driving shaft, which is coupled to the reflective mirror.

5. The device of claim 1, wherein the permanent magnet is provided with an installation hole penetratingly formed at an inner center portion, allowing the driving shaft to be inserted thereinto, and therefore the permanent magnet is integrally coupled to the driving shaft.

6. The device of claim 1, wherein the yokes comprise:
    a first yoke a first yoke formed to encompass a part of the outer wall of the housing, which the coil does not encompass; and second and third yokes formed to encompass the coil and having shapes corresponding to each other.

7. The device of claim 6, wherein a reference position is established such that an upper surface of the permanent magnet maintains the same height as that of the first yoke.

8. The device of claim 1, wherein the springs are plate-shaped ones, and have central holes penetratingly formed to fix the driving shaft at its center.

9. The device of claim 8, wherein outer circumference portions of the springs are coupled to an inner circumference of the housing to thereby fix the driving shaft.

10. The device of claim 1, wherein the springs having shapes asymmetrical to each other make a wobbling motion in a circular path or in an elliptical path, centering on the pivot of the housing.

11. The device of claim 1, wherein the yokes are formed of materials having high permeability.

12. The device of claim 1, wherein the coil is at least one solenoid.

* * * * *